US011003565B2

(12) United States Patent
Gay et al.

(10) Patent No.: US 11,003,565 B2
(45) Date of Patent: May 11, 2021

(54) PERFORMANCE CHANGE PREDICTIONS

(71) Applicant: Hewlett-Packard Development Company, L.P., Houston, TX (US)

(72) Inventors: Raphael Gay, Fort Collins, CO (US); Peter C Peterson, Fort Collins, CO (US); Kirsten Olsen, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 330 days.

(21) Appl. No.: 15/544,650

(22) PCT Filed: Apr. 21, 2015

(86) PCT No.: PCT/US2015/026855
§ 371 (c)(1),
(2) Date: Jul. 19, 2017

(87) PCT Pub. No.: WO2016/171671
PCT Pub. Date: Oct. 27, 2016

(65) Prior Publication Data
US 2017/0351593 A1    Dec. 7, 2017

(51) Int. Cl.
*G06F 11/34* (2006.01)
*G06F 11/30* (2006.01)
(Continued)

(52) U.S. Cl.
CPC ...... *G06F 11/3428* (2013.01); *G06F 11/3024* (2013.01); *G06F 11/3442* (2013.01);
(Continued)

(58) Field of Classification Search
CPC ............. G06F 11/3428; G06F 11/3466; G06F 11/3024; G06F 11/3442; G06F 2201/88;
(Continued)

(56) References Cited

U.S. PATENT DOCUMENTS 7,058,560 B1    6/2006  Arakawa et al.
7,774,657 B1    8/2010  Hardman
(Continued)

FOREIGN PATENT DOCUMENTS

WO    WO-2013/077891 A1    5/2013

OTHER PUBLICATIONS

Willhalm et al. "Intel® Performance Counter Monitor—A Better Way to Measure CPU Utilization", Aug. 16, 2012, Intel, pp. 1-15.*
(Continued)

*Primary Examiner* — Mohamed Charioui
*Assistant Examiner* — Eyob Hagos
(74) *Attorney, Agent, or Firm* — Brooks Cameron & Huebsch PLLC

(57) ABSTRACT

An example system for a performance gains predictor includes a counter engine to determine a number of events during an application session of a computing system utilizing a first processor, a metrics engine to calculate a number of metrics for the first processor based on the number of events, a factor engine to determine a number of factors of the first processor that can affect the number of metrics based on an evaluation of the computing system, and a performance engine to predict a performance change of the computing system utilizing a second processor based on the number of factors.

11 Claims, 5 Drawing Sheets

(51) Int. Cl.
*G06Q 10/04* (2012.01)
*G06Q 30/02* (2012.01)

(52) U.S. Cl.
CPC ......... *G06F 11/3466* (2013.01); *G06Q 10/04* (2013.01); *G06F 2201/86* (2013.01); *G06F 2201/88* (2013.01); *G06Q 30/0283* (2013.01)

(58) Field of Classification Search
CPC . G06F 2201/86; G06Q 10/04; G06Q 30/0283
See application file for complete search history.

(56) References Cited

U.S. PATENT DOCUMENTS

| | | | |
|---|---|---|---|
| 7,921,313 B2 | 4/2011 | Ghiasi et al. | |
| 8,255,516 B1* | 8/2012 | Zhang | H04L 67/10 709/203 |
| 2006/0168571 A1* | 7/2006 | Ghiasi | G06F 9/505 717/127 |
| 2006/0253715 A1 | 11/2006 | Ghiasi et al. | |
| 2008/0133211 A1* | 6/2008 | Dombrowski | G06Q 30/06 703/22 |
| 2009/0287744 A1* | 11/2009 | Bernardini | G06F 11/3495 |
| 2010/0037101 A1 | 2/2010 | Zakonov et al. | |
| 2011/0295993 A1 | 12/2011 | Ochi et al. | |
| 2012/0079235 A1 | 3/2012 | Iyer et al. | |
| 2012/0221873 A1 | 8/2012 | Wells et al. | |
| 2014/0208141 A1* | 7/2014 | Bhandaru | G06F 1/3206 713/322 |
| 2015/0347274 A1* | 12/2015 | Taylor | G06F 11/362 717/125 |

OTHER PUBLICATIONS

Liu et al., "Performance Prediction for Reconfigurable Processor," 2012 IEEE 14th International Conference on High Performance Computing and Communications, 2012, 8 pages.

PCT Search Report/Written Opinion, Application No. PCT/US2015/026855 dated Jan. 21, 2016, 13 pages.

Eyerman et al., "Mechanistic-Empirical Processor Performance Modeling for Constructing CPI Stacks on Real Hardware," Apr. 15, 2011, ELIS Department, Ghent Univ. Begium, 11 pages.

* cited by examiner

PERFORMANCE CHANGE PREDICTIONS

BACKGROUND

Computing systems (e.g., computer, server, datacenter, etc.) can utilize hardware and software to perform a number of functions. For example, the computing systems can utilize processors to execute instructions. Updates to hardware of the computing system can be an important investment for the owner or manager of the computing system. In deciding whether to update hardware it can be important to understand the benefits and detriments that the updates may provide.

DETAILED DESCRIPTION

Figure 1:
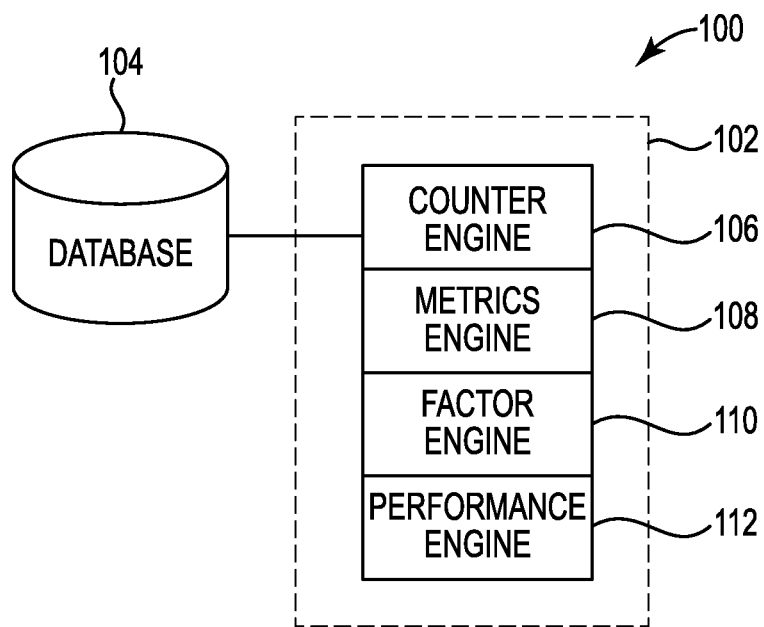
FIG. 1 illustrates a diagram of an example of a system for a performance change predictions consistent with the present disclosure.

System performance and corresponding financial costs can be key factors when purchasing a processor for a computing system (e.g., server, computer, etc.). In some cases the system performance may not increase linearly with the corresponding financial costs of the processor. It can be difficult to determine how processor specification changes (e.g., core frequency, maximum power dissipation, etc.) will affect the system performance of a computing system. In some cases, adding a processor with increased performance specifications may not result in noticeable system performance increases of the computing system. Thus, investments in a processor for the computing system can lead to a customer being unsatisfied with the resulting system performance. Being able to accurately predict performance changes of a computing system for different processors can help customers make informed decisions when deciding whether to purchase a particular processor for the computing system.

A number of methods, systems, and computer readable medium for a performance gains predictor are described herein. The performance gains predictor can precisely predict a number of performance gains or losses that an end user would experience when utilizing a number of different processors (e.g., processing resource, etc.) with a particular computing system. Updating hardware such as processors can be an expensive investment for an end user (e.g., organization, business, etc.). The end user can utilize a particular system that includes hardware devices that can affect the performance of the processor and/or computing system. In addition, the end user can utilize particular applications and perform particular workloads that can also affect the performance of the processor and/or overall computing system.

The performance gains predictor can utilize a number of events that are monitored during an application session utilizing a first processor (e.g., existing processor of the computing system, etc.) and existing hardware in order to more precisely predict the number of performance gains or losses that an end user would experience with a second processor (e.g., a processor that is different than the first processor, a processor with different specifications than the first processor, etc.). The number of events can be utilized to identify a number of performance bottlenecks (e.g., performance limiting processes, performance limiting events, performance limiting workloads, etc.). The number of bottlenecks can identify key events from the number of events.

The key events can be utilized to identify a number of metrics. The number of metrics can be a normalized representation of the identified key events. The number of metrics can be unit-less representations, time-compensated representations, and/or basic representations that can be utilized to calculate and predict a performance change between a first processor and a second processor. The performance gains predictor can utilize the number of metrics to determine a number of factors. The number of factors can include upside factors and damping factors. The upside factors can represent performance gains or losses between the first processor and the second processor based on a difference in specifications between the first and second processor such as core frequency and maximum power dissipation. In some examples, the upside factors can also include a number of additional upside factors such as: number of cores, cache size, and/or memory size, among other upside factors for applications that scale with particular processor characteristics.

The damping factors can represent conditions related to the application or to the computing system that limit the performance gains between the first processor and the second processor. For example, the damping factors can "dampen" potential upside factors from the difference in specifications between the first processor and the second processor. In some examples, the damping factors can have a positive influence on performance gain for the computing system even when the upside factors include a number of performance losses. For example, when the second processor includes a performance loss compared to the specification of the first processor, a damping factor such as pipeline stalls can "dampen" the performance loss of the second processor and the overall performance loss of the computing system utilizing the second processor can be less than predicted when only considering the difference in specification between the first processor and the second processor.

The upside factors and damping factors can be utilized to predict the performance change between the first processor and the second processor. In some examples, the performance gains predictor can display the performance change between the first processor and a plurality of other processors including the second processor. The displayed performance change can include a number of performance specifications of the first processor and the plurality of other processors. The performance gains predictor can be utilized to predict a performance change for computing systems that utilize a plurality of processors to execute instructions of an application during the application session. Examples used herein refer to a first processor and a second processor for ease of reference, but the first processor can represent a plurality of existing processors for a computing system and the second processor can represent a plurality of different processors with different specifications from the plurality of existing processors. In some examples, when there are a plurality of processors for a computing system the performance change can be determined by calculating the gains or losses for each of the plurality of processors at each sample during the application session and applying a combination equation (e.g., average, geometric mean, median, etc.) to each sample as needed.

In addition, the displayed performance change can include a cost (e.g., financial cost to purchase, etc.) of each of the plurality of other processors. The displayed performance change can be utilized to compare a system experience of the first processor to a predicted system experience of the plurality of other processors. In some examples, the first processor can be an existing processor for a computing system and a second processor can be a separate and different processor than the first processor.

Figure 2:
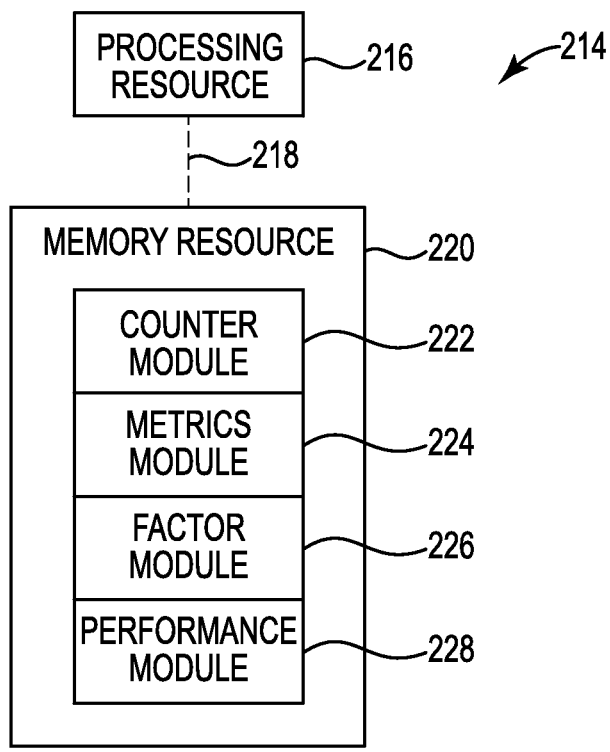
FIG. 2 illustrates a diagram of an example computing device for performance change predictions consistent with the present disclosure.

FIGS. 1 and 2 illustrate examples of system 100 and computing device 214 consistent with the present disclosure. FIG. 1 illustrates a diagram of an example of a system 100 for a performance gains predictor consistent with the present disclosure. The system 100 can include a database 104, a performance gains predictor system 102, and/or a number of engines (e.g., counter engine 106, metrics engine 108, factor engine 110, performance engine 112, etc.). The performance gains predictor system 102 can be in communication with the database 104 via a communication link, and can include the number of engines (e.g., counter engine 106, metrics engine 108, factor engine 110, performance engine 112, etc.). The performance gains predictor system 102 can include additional or fewer engines that are illustrated to perform the various functions as will be described in further detail in connection with FIGS. 3-6.

The number of engines (e.g., counter engine 106, metrics engine 108, factor engine 110, performance engine 112, etc.) can include a combination of hardware and programming, but at least hardware, that is configured to perform functions described herein (e.g., determine a number of events during an application session of a computing system utilizing a first processor, calculate a number of metrics for the first processor based on the number of events, determine a number of factors of the first processor that can affect the number of metrics based on an evaluation of the computing system, predict a performance change of the computing system utilizing a second processor based on the number of factors, etc.). The programming can include program instructions (e.g., software, firmware, etc.) stored in a memory resource (e.g., computer readable medium, machine readable medium, etc.) as well as hard-wired program (e.g., logic).

The counter engine 106 can include hardware and/or a combination of hardware and programming, but at least hardware, to determine a number of events during an application session of a computing system utilizing a first processor. Determining the number of events during an application session can include utilizing a hardware performance counter to determine a number of events while running applications and/or workloads that are specific to the computing system utilizing the first processor. Thus, the number of events can represent a performance of the computing system utilizing the first processor. The number of events can include processor core dependent bottlenecks and/or processor core independent bottlenecks for the computing system. In some examples, the counter engine 106 can determine and collect samples of the number of events. The counter engine 106 can collect and store the samples of the number of events in the database 104 and/or other computer readable medium.

Processor core dependent bottlenecks can include performance limiting processes and/or performance limiting specifications of the first processor. The processor core dependent bottlenecks can include a percentage of time where performance was limited by the processor frequency of the first processor during the application session. In addition, the processor core dependent bottlenecks can include a percentage of time where performance was limited by the processor power of the first processor during the application session. That is, processor core dependent bottlenecks can represent performance limiting processes that can limit the performance of the computing system.

Processor core independent bottlenecks can include performance limiting processes and/or performance limiting specifications that are independent from the first processor. That is, the processor core independent bottlenecks can include performance limiting processes that may not be affected by utilizing a different processor with the computing system. The processor core independent bottlenecks can include, but are not limited to: graphics utilization, and/or back-end pipeline stalls in each core of the first processor during the application session.

The metrics engine 108 can include hardware and/or a combination of hardware and programming, but at least hardware, to calculate a number of metrics for the first processor based on the number of events. The number of metrics can be calculated by normalizing a number of the key events (e.g., collected samples of the number of key events, etc.) from the number of events. The number of key events can be processor core dependent bottlenecks and/or processor core independent bottlenecks that can affect the performance of a processor and/or an end user experience of the computing system. Normalizing the number of key events can provide a basic, unit-less, and/or time-compensated value that can be utilized to determine a number of upside factors and/or damping factors. In some examples, the performance metrics for the first processor can be based on the application session of the computing system utilizing the first processor and the performance metrics for the second processor can be based on a predicted application session of the computing system utilizing the second processor.

The factor engine 110 can include hardware and/or a combination of hardware and programming, but at least hardware, to determine a number of factors of the first processor that can affect the number of metrics based on an evaluation of the computing system. The number of factors can be determined based on the number of metrics. The number of factors can include upside factors that can represent a performance change based on a difference in the specification of the first processor and the second processor and/or damping factors that can represent conditions related to the application and/or computing system that can dampen the upside factors. The number of factors can be determined by comparing the first processor to a number of different processors (e.g., second processor, etc.) with different specifications. That is, the number of factors can include a number of upside factors that represent percentage differences (e.g., percentage increases, percentage decreases, etc.) of specification metrics between the first processor and the second processor. In some examples, the number of factors can include a number of damping factors that can "dampen" (e.g., limit) the number of upside factors and represent a number of conditions that can impact the first processor during the application session.

The number of upside factors can include a processor frequency upside (e.g., processor frequency gain, processor frequency loss, etc.). The processor frequency upside can be a processor frequency increase or decrease that is based on a comparison between the monitored events of the first processor during the application session and a second processor. For example, the first processor can have a frequency of 1.8 gigahertz (GHz). In this example, the first processor can be compared to a second processor that has a frequency of 3.3 GHz. In this example, the processor frequency upside can be 84% (e.g., 3.3 GHz/1.8 GHz).

The number of upside factors can include a processor power upside (e.g., processor power gain, processor power loss, etc.). The processor power upside can be a processor power increase that is based on a comparison between the first processor during the application session and a second processor. For example, the first processor can have a power of 80 watts (W) and the second processor can have a power of 130 W. In this example, the processor power upside can be 62% (e.g., 130 W/80 W).

The number of damping factors can represent bottlenecks experienced during the application session that may limit the performance gains or losses resulting from the number of upside factors. The number of damping factors can include frequency damping factors, power damping factors, core-specific damping factors and core independent damping factors. The number of damping factors can more precisely predict the performance change since the computing system performance can depend on more than processor core speed. For example, some applications can depend on accessing external data sources such as main memory or on task execution by a graphics or subsystem.

The performance engine 112 can include hardware and/or a combination of hardware and programming, but at least hardware, to predict a performance change of the computing system utilizing a second processor based on the number of factors. In some examples, the performance change can represent a percent completion time change of the application between the application session and a predicted application session of the computing system utilizing the second processor. The performance change of the computing system utilizing the second processor can include utilizing the number of factors in a performance prediction equation as described further herein. The prediction equation can utilize the upside factors and damping factors to determine the performance change between the first processor and the second processor.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., determine processor events and non-processor events from an application session of a computing system utilizing a first processor, calculate a number of processor dependent metrics and processor independent metrics for the application session based on the processor events and non-processor events, determine a number of processor factors based on a comparison between the processor dependent metrics and processor independent metrics of the first processor, calculate a performance prediction of a number of different processors for the computing system based on a comparison of processor factors between the first processor and the number of different processors, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., counter module 222, metrics module 224, factor module 226, performance module 228, etc.) can include CRI that when executed by the processing resource 216 can perform functions. The number of modules (e.g., counter module 222, metrics module 224, factor module 226, performance module 228, etc.) can be sub-modules of other modules. In another example, the number of modules (e.g., counter module 222, metrics module 224, factor module 226, performance module 228, etc.) can comprise individual modules at separate and distinct locations (e.g., CRM, etc.).

Each of the number of modules (e.g., counter module 222, metrics module 224, factor module 226, performance module 228, etc.) can include instructions that when executed by the processing resource 216 can function as a corresponding engine as described herein. For example, the counter module 222 can include instructions that when executed by the processing resource 216 can function as the counter engine 106 as referenced in FIG. 1.

Figure 3:
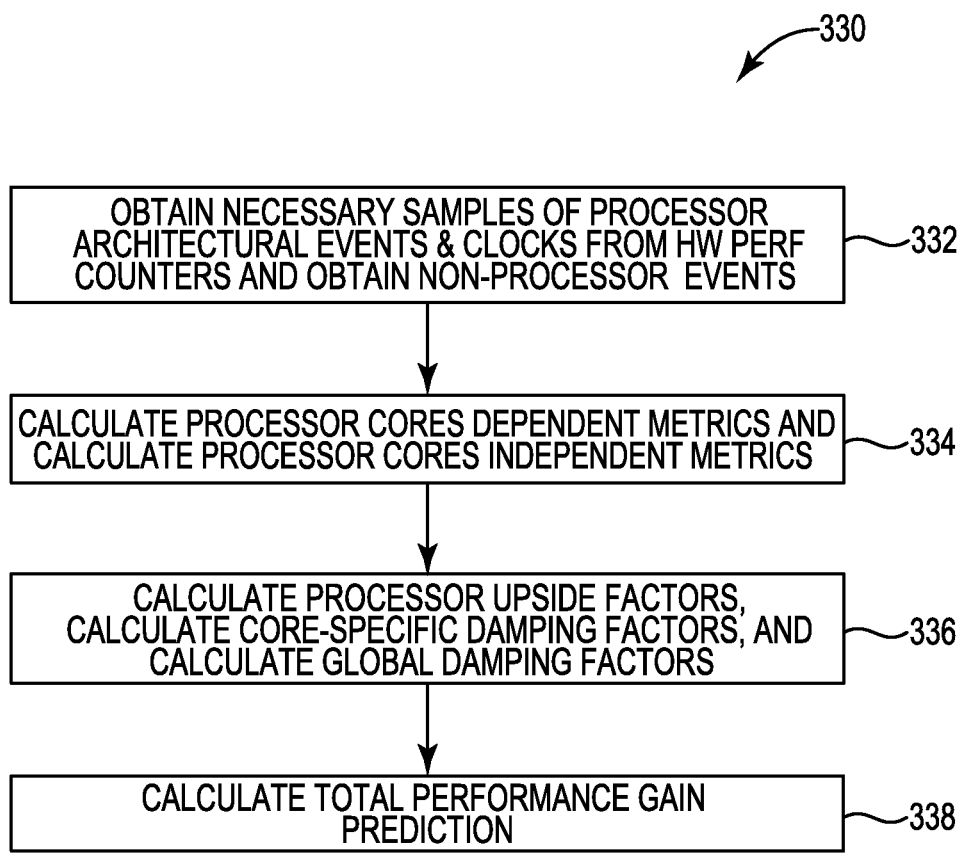
FIG. 3 illustrates a flow chart of an example for performance change predictions consistent with the present disclosure.

FIG. 3 illustrates a flow chart of an example for performance gains prediction 330 consistent with the present disclosure. The performance gains prediction 330 can be utilized to predict performance changes between a first processor utilized during an application session of a computing session and a second processor. The performance gains prediction 330 can utilize real-time data during the application session to provide a more precise real-time, or post-processed after the completion of the application, prediction of how the second processor will perform in the computing system.

At box 332 the performance gains prediction 330 can include obtaining necessary processor architectural events and clocks from hardware performance counters and obtaining non-processor events (e.g., non-processor architecture events, etc.). That is, the performance gains prediction 330 can include obtaining a number of events during an application session utilizing a number of performance hardware counters. Obtaining the number of events and/or clocks from the hardware performance counters can increase precision in determining a performance change between a first processor and a second processor.

At box 334 the performance gains prediction 330 can include calculating processor core dependent metrics and calculating processor core independent metrics. Calculating the processor core dependent metrics and processor core independent metrics can include normalizing a number of key events (e.g., key processor architecture events, etc.) from the number of processor events and clocks received from the hardware performance counters.

In some examples, calculating the processor core dependent metrics can include calculating a percentage of the time the processor was limited by the turbo frequency (e.g., turbo limit, % TurboLimit, % TimeTurboLimit), a percentage of the time the processor was limited by a maximum power of the processor (e.g., power limit, % PowerLimit, % TimePowerLimit), a percentage of time each core of the processor was active (e.g., percent core active, % CoreActive[x]), and/or a percentage of time each core of the processor was experiencing pipeline stalls (e.g., % CorePipelineStalls). In some examples, the percent turbo limit can be calculated by dividing a frequency of maximum power cycles for the first processor by a number of clock ticks (e.g., PCU_FREQ_MAX_POWER_CYCLES/PCU_CLOCKTICKS).

In some examples, the percent power limit can be calculated by dividing a frequency of maximum current cycles for the first processor by a number of clock ticks (e.g., PCU_FREQ_MAX_CURRENT_CYCLES/PCU_CLOCK-TICKS). In some examples, the percent core active can be calculated by dividing an unhalted clock of a core of the first processor by a difference between a time stamp counter stop time and a time stamp counter start time (e.g., CORE[x]_CLK_UNHALTED.REF/(TSC_SAMPLING_STOP-TSC_SAMPLING_START)). In some examples, the percent core pipeline stalls can be calculated by dividing core resource stalls by an unhalted clock of a core of the first processor (e.g., CORE[x]_RESOURCE_STALLS.ANY/CORE[x]_CLK_UNHALTED.REF).

Calculating the processor core independent metrics can include calculating a percent graphics utilization for the computing system utilizing the first processor. In some examples, calculating the processor core independent metrics can include calculating a percent graphics utilization by determining a percent graphics utilization rate (e.g., % GRAPHICS_UTILIZATION_RATE) from a number of monitors (e.g., hardware counters, etc.) of the computing system. In some examples additional processor core independent metrics can include, but are not limited to: I/O accesses such as networking and/or storage.

At box 336 the performance gains prediction 330 can include calculating processor upside factors, calculating processor core-specific damping factors, and calculating global damping factors. The performance gains prediction 330 can calculate the processor upside factors, core-specific damping factors, and global damping factors by comparing the determined metrics of the first processor to processor specifications of the second processor utilizing the number of upside factors and damping factors as described herein.

As described herein, the metrics of the first processor can be based on real-time events observed by a hardware performance counter.

The processor upside factors can include processor frequency upside and processor power upside as described herein. The processor frequency upside can be a processor frequency increase or decrease that is based on a comparison between the monitored events of the first processor during an application session and specifications of a second processor. For example, the first processor can have a specification frequency (e.g., frequency listed in manufacturer specification, etc.) of 1.8 gigahertz (GHz). In this example, the first processor can be compared to a second processor that has a frequency of 3.3 GHz. In this example, the processor frequency upside can be 84% (e.g., 3.3 GHz/1.8 GHz).

The processor power upside can be a processor power increase that is based on a comparison between the first processor during the application session and a specification of a second processor. For example, the first processor can have a power of 80 watts (W) and the second processor can have a specification power (e.g., power listed in manufacturer specification, etc.) of 130 W. In this example, the processor power upside can be 62% (e.g., 130 W/80 W).

The number of core-specific damping factors can represent bottlenecks experienced during the application session that may limit or dampen performance changes resulting from the upside factors. The number of core-specific damping factors can include frequency damping factors and/or power damping factors. The number of core-specific damping factors can more precisely predict the performance change since the computing system performance can depend on more than processor core speed. For example, some applications can depend on accessing external data sources such as main memory or on task execution by a graphics or subsystem.

The number of global damping factors can include a percent graphics utilization of the computing system that utilizes the first processor during the application session. In some examples, the global damping factors can include a representative value based on whether the percent graphics utilization for the computing system is greater than or less than 90 percent capacity. In some examples, the core-specific damping factors and/or global damping factors can limit the processor upside factors when calculating the total performance prediction. As described herein, the number of global damping factors can also include a number of additional damping factors.

At box 338 the performance gains prediction 330 can include calculating total performance prediction. The total performance prediction can include a performance change of the computing system utilizing a first processor if the computing system were to be upgraded with a second processor.

The performance gains prediction 330 can calculate a total processor upside by utilizing Equation 1. Equation 1—Processor Upside=% ProcFreqGain×(% TurboLimit/100)+% ProcPwrGain×(% PowerLimit/100). In Equation 1 the % ProcFreqGain can equal a percent processor frequency gain or percent processor frequency loss that can be determined by comparing a frequency specification of a first processor and a second processor. In addition, the % TurboLimit damping factor can equal a percent turbo limit that can be determined by measuring the percentage of time the processor performance is limited by the turbo frequency during the application session with a first processor. The % ProcPwrGain can equal a percent power gain or a percent power loss that can be determined by comparing a power specification of a first processor and a second processor. Furthermore, the % PowerLimit damping factor can equal a percent power limit that can be determined by measuring the percentage of time the processor performance is limited by the processor power limit during the application session.

In some examples, the performance gains prediction 330 can calculate a pipeline stall damping by utilizing Equation 2. Equation 2—Pipeline Stall Damping=1−($\Sigma_{C=1 \ to \ number \ of \ cores}$ (% CorePipelineStall$_{[C]}$/100×% CoreActive$_{[C]}$/100))$_{[S]}$/#of Cores. The % CorePipelineStall can be a percentage of pipeline stall time that is associated with a first processor during an application session. The % CoreActive can be a percentage of active time for a particular core of the first processor during the application session. The #of Cores can be a quantity of cores of the first processor. The S can represent a respective sample of the first processor during the application session.

In some examples, the performance gains prediction 330 can calculate a graphics damping by utilizing Equation 3. Equation 3—Graphics Damping=1−% GraphicsUtilization$_{[S]}$ [(multiply by 1 if <90%), (equals 100% if > or = to 90%)]/100. The −% GraphicsUtilization$_{[S]}$ can represent a percent graphics utilization for a sample that is observed during the application session.

In some examples a total performance can be calculated by utilizing Equation 4. Equation 4—Total Performance Gain=$\Sigma_{S=1 \ to \ \#of \ samples}$ ((% ProcFreqGain×(% TurboLimit$_{[S]}$/100)+% ProcPwrGain×(% PowerLimit$_{[S]}$/100))* (1−($\Sigma_{C=1 \ to \ \#of \ cores}$ (% CorePipelineStall$_{[C]}$/100×% CoreActive$_{[C]}$/100))$_{[S]}$/#of Cores)×(1−% GraphicsUtilization$_{[S]}$ [(multiply by 1 if <90), (=100% if > or =90)]/100)))/#of Samples.

The number of equations (e.g., Equations 1-4) can be utilized to determine a performance change between the first processor and the second processor. The number of equations can provide a better representation of end user experience compared to previous methods and systems for predicting performance changes.

Figure 4:
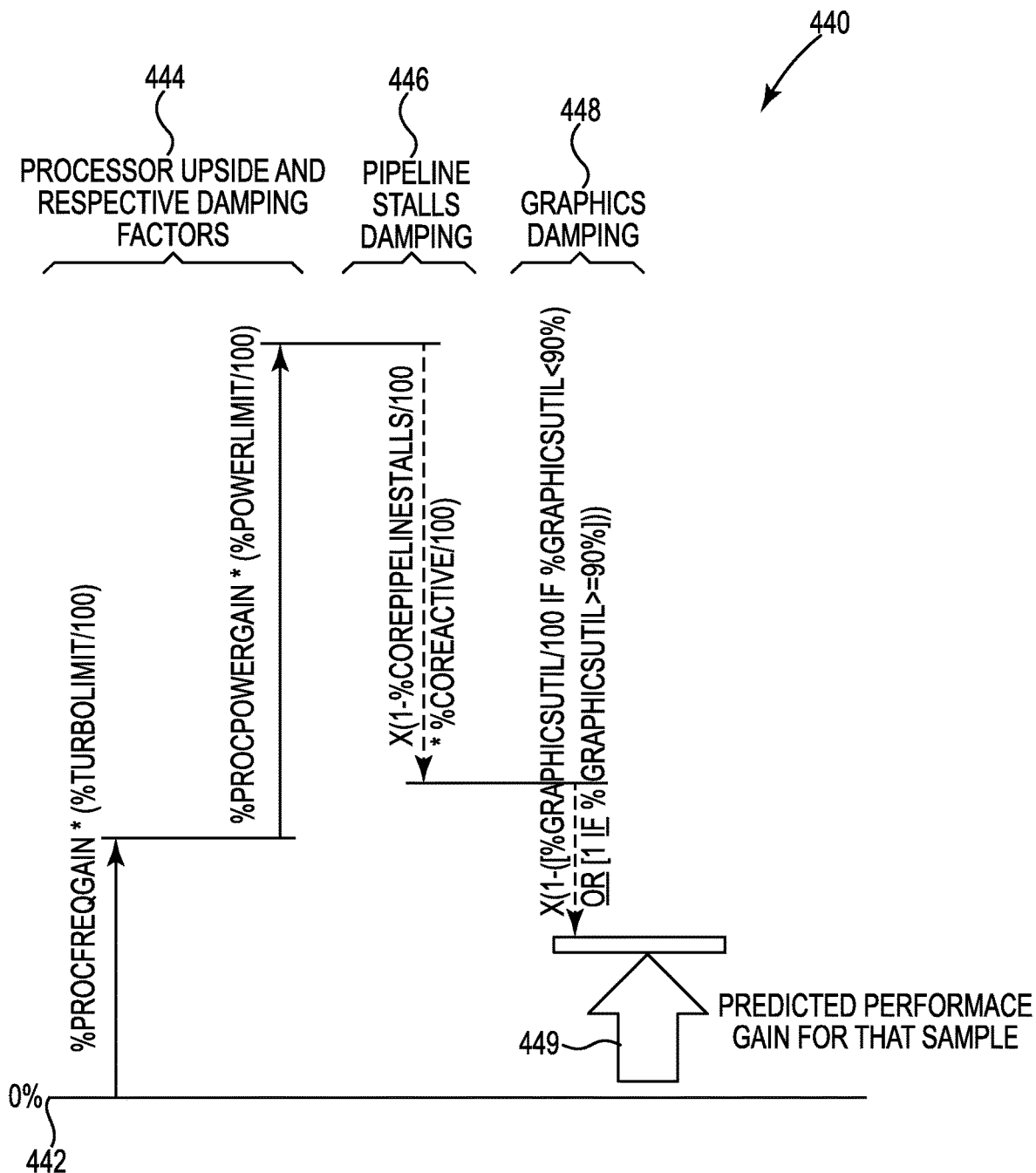
FIG. 4 illustrates an example graph for performance change predictions consistent with the present disclosure.

FIG. 4 illustrates an example graph for performance gains prediction 440 consistent with the present disclosure. The graph for performance gains prediction 440 can be a visual representation of how the processor upside 444 can be affected by the pipeline stall damping 446 and graphics damping 448 as described herein. For example, the graph for performance gains prediction 440 can have a baseline 442 that represents a zero percent change between a first processor utilized by a computing system during an application session and a specification of a second processor that is different from the first processor.

The graph for performance gains prediction 440 can include a number of processor upsides 444 that can increase a percentage of performance. The processor upsides 444 can include a percent processor frequency gain and/or a percent processing power gain, with their respective frequency and power damping factors. In some examples, the percent processor frequency gain and/or percent processing power gain can be calculated based on a comparison of processor metrics between the first processor during the application session and the specification of the second processor.

The graph for performance gains prediction 440 can include pipeline stalls damping 446. As described herein, the pipeline stalls damping 446 can be calculated based on a percentage of pipeline stalls and a percentage of core activity. In some examples the pipeline stalls damping 446 can be a damping effect on the computing system despite a change in processing capabilities of the processor.

The graph for performance gains prediction 440 can include graphics damping. The graphics damping 448 can be determined based on observations during the application session of the computing system. The graphics damping 448 can be a damping effect on the computing system despite a change in processing capabilities of the processor. As described herein, considering the processor upside 444, the pipeline stalls damping 446, and the graphics damping 448 can provide a more precise predicted performance gains 449 (e.g., performance change, etc.) compared to previous methods and systems.

Figure 5:
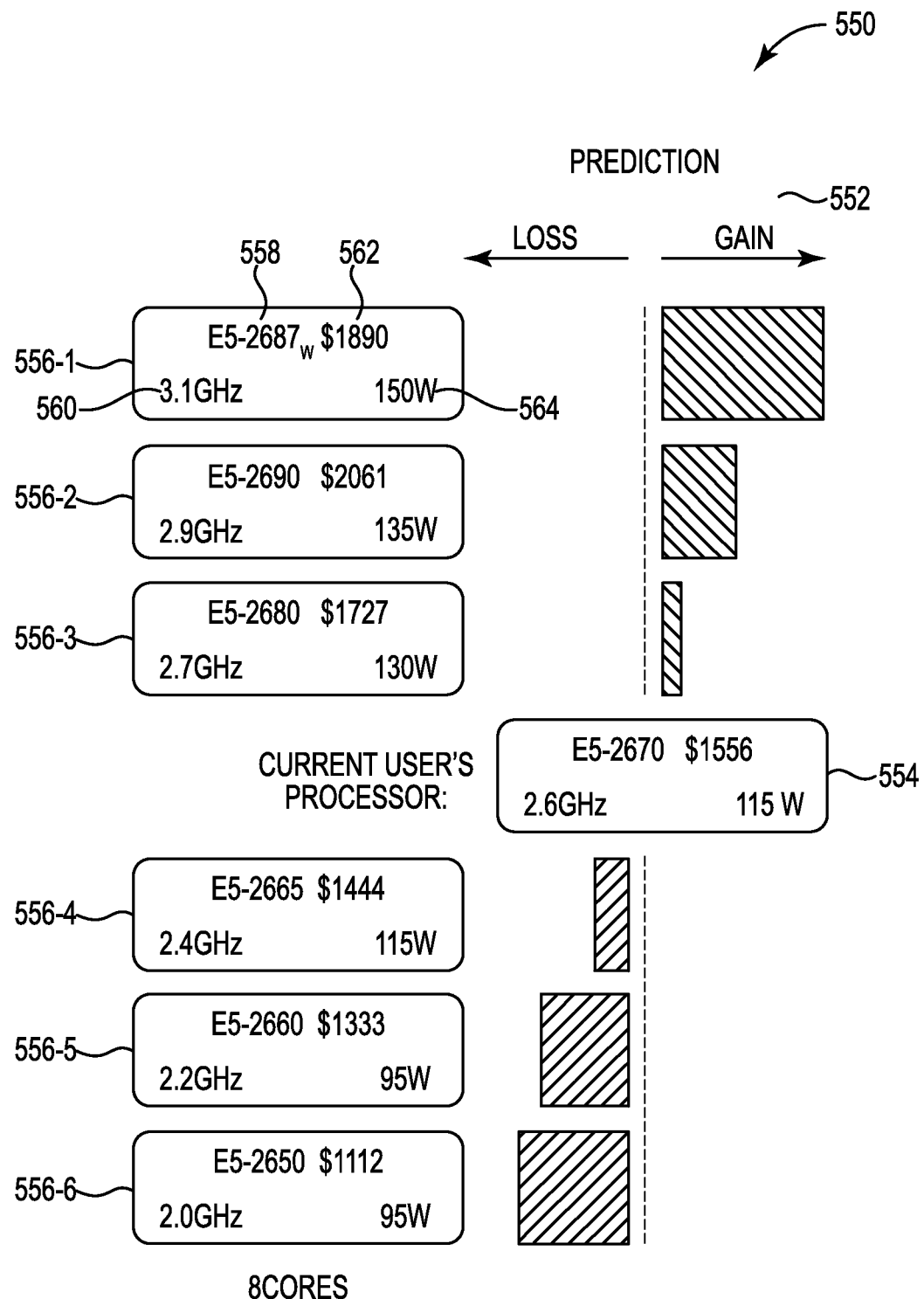
FIG. 5 illustrates an example display of performance change consistent with the present disclosure.

FIG. 5 illustrates an example display of performance change 550 consistent with the present disclosure. The display of performance change 550 can be displayed to a user via a user interface that is coupled to a computing device or system (e.g., computing device 214 as referenced in FIG. 2, system 100 as referenced in FIG. 1, etc.). The display of performance change 550 can be utilized to display end user performance change for a number of different processors 556-1, 556-2, 556-3, 556-4, 556-5, 556-6. That is, the display of performance change 550 can show a user's current processor 554 and a number of different processors 556-1, 556-2, 556-3, 556-4, 556-5, 556-6 at corresponding performance positions based on a predicted performance change as described herein.

The display of performance change 550 can include a prediction graph 552 that can display a percentage gain and/or percentage loss of predicted performance compared to the user's current processor 554. In addition, the display of performance change 550 can include a number of different processors 556-1, 556-2, 556-3, 556-4, 556-5, 556-6 at corresponding locations to the value in the prediction graph 552.

Each of the number of different processors 556-1, 556-2, 556-3, 556-4, 556-5, 556-6 can include a number of corresponding features. The number of corresponding features can include, but are not limited to: a model name 558, a cost 562, a frequency 560, and/or a power 564. Each of the corresponding features can be utilized to help a user decide if the percentage of gain or loss in the prediction graph 552 is worth the cost 562 of the processor.

Figure 6:
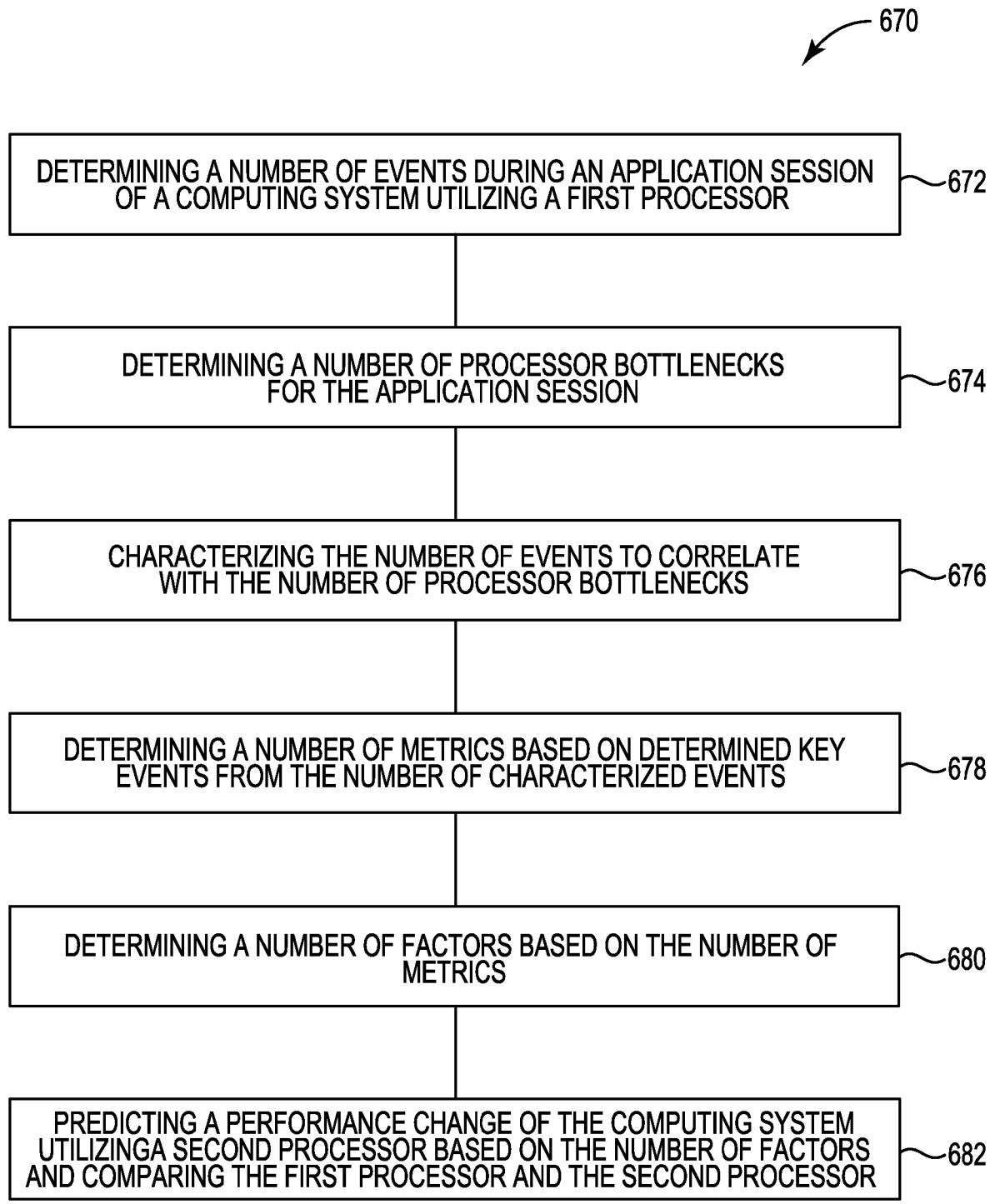
FIG. 6 illustrates a flow chart of an example method for processor performance change predictions consistent with the present disclosure.

FIG. 6 illustrates a flow chart of an example method 670 for processor performance gains prediction consistent with the present disclosure. The method 670 can be executed by a computing device or system (e.g., computing device 214 as referenced in FIG. 2, system 100 as referenced in FIG. 1, etc.). The method 670 can provide a more precise performance change for a particular computing device compared to previous systems and methods.

At box 672 the method 670 can include determining a number of events during an application session of a computing system utilizing a first processor. In some examples, the number of events can be determined based on real-time data collected by a hardware counter during the application session. The number of events can include, but are not limited to: Portable Communication Unit (PCU) frequency max power cycles, PCU frequency max current cycles, core clock unhalted, core resource stalls, core activity clocks, clocks to determine a relatively precise evaluation of sampling durations of the application session. The number of events can be related to other hardware and software components of the computing system as well as a workload type that is utilized by the computing system.

In some examples, the computing system can be an end user computing system that is currently utilizing the first processor. In this example, the end user may be attempting to determine if the first processor should be replaced by a second processor with increased performance (e.g., greater frequency, greater power, etc.). In this example, the number of events can be collected during an application session that the end user would normally utilize the computing system to perform. In this way, the number of events can better correspond to a particular end user's computing system and provide a more precise prediction of how the second processor will perform in the computing system operating the particular software for a particular workload.

At box 674 the method 670 can include determining a number of processor bottlenecks for the application session. As described herein, the number of events can include a number of bottlenecks. For example, the number of bottlenecks can include core dependent bottlenecks and core independent bottlenecks. The core dependent bottlenecks can include frequency and power limitations of the first processor. The core independent bottlenecks can include graphics utilization and/or back-end pipeline stalls.

At box 676 the method 670 can include characterizing the number of events to correlate with the number of processor bottlenecks. Characterizing the number of events can include categorizing the number of events into a number of categories. For example, the number of categories can include processor architecture events (e.g., PCU frequency max power cycles, PCU frequency max current cycles, etc.), processor architecture clocks (e.g., PCU clock ticks, invariant time stamp counter, etc.), and/or non-processor architecture events (e.g., graphics utilization, etc.). In some examples, the characterizing of the number of events can include determining a number of key events (e.g., samples of key events) for the first processor during the application session. The number of key events can be bottlenecks that can most greatly affect a second processor's capabilities of increasing performance of the computing system.

At box 678 the method 670 can include determining a number of metrics based on determined key events from the number of characterized events. Determining the number of metrics can include normalizing data from the number of key events into basic, unit-less, and time-compensated quantities that can be utilized to calculate a number of factors. As described herein, the number of metrics can be categorized into processor core dependent metrics (e.g., percent turbo limit=PCU frequency max power cycles/PCU clock ticks, percent power limit=PCU frequency max current cycles/PCU clock ticks, etc.) and/or processor core independent metrics (e.g., graphics utilization rate, etc.).

At box 680 the method 670 can include determining a number of factors based on the number of metrics. As described herein, the number of factors can be based on the number of metrics and/or based on a comparison between the first processor and a second processor. The number of metrics can be utilized to determine bottlenecks which can identify rate limiting steps that can either positively affect or negatively affect a second processor in the computing system. The number of factors can be categorized into upside factors and damping factors. The number of factors can be compared and utilized to predict a performance change of the computing system as described herein.

At box 682 the method 670 can include predicting a performance change of the computing system utilizing a second processor based on the number of factors and comparing the first processor and the second processor. Comparing the first processor to the second processor can include comparing the real-time event data collected during the application session to specifications of the second processor. In some examples, predicting the performance change can include comparing the number of metrics for the first processor with a number of factory metrics (e.g., factory specifications, manufacturer specifications, etc.) of the second processor.

Utilizing the real-time event data collected during the application session using the first processor in a specific system can provide more precise predictions of performance change compared to previous systems and methods. For example, previous systems and methods may not utilize event data from a specific system operation with specific software and/or hardware to execute an application session.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system for a performance gains predictor, comprising:
   a non-transitory computer readable medium storing instructions executable by a processing device, wherein the instructions are executable to:
   determine a number of events during an application session of a computing system utilizing a first processor to execute the application session;
   determine a number of key events during the application session, wherein the number of key events include processor core dependent bottlenecks and processor core independent bottlenecks, wherein the processor core dependent bottlenecks includes a percentage of time where performance was limited by a processor frequency of the first processor during the application session and a percentage of time where performance was limited by a processor power of the first processor during the application session, wherein the processor core independent bottlenecks includes graphics utilization and back-end pipeline stalls in each core of the first processor during the application session;
   calculate a number of processor core dependent metrics and processor core independent metrics for the first processor based on the number of events during execution of the application session, wherein the number of processor core dependent metrics and processor core independent metrics are calculated by normalizing the number of key events from the number of events;
   determine a number of factors of the first processor that affect the number of processor core dependent metrics and processor core independent metrics based on an evaluation of the computing system when utilizing the first processor to execute the application session;
   compare the number of factors based on real-time event data when utilizing the first processor to a number of factory metrics of a second processor to determine a performance change of the computing system if the computing system were to replace the first processor with the second processor; and display metrics of the first processor and the second processor at corresponding performance positions based on the performance change.

2. The system of claim 1, wherein the second processor is a separate and different processor than the first processor.

3. The system of claim 1, wherein the number of factors include a number of upside factors that represent percentage differences of specification metrics between the first processor and the second processor.

4. The system of claim 3, wherein the number of factors include a set of damping factors that limit the number of upside factors and represent a number of conditions external to the first processor during the application session.

5. The system of claim 1, wherein performance change represents a percent completion time change of the application between the application session and a predicted application session of the computing system utilizing the second processor.

6. The system of claim 1, wherein the instructions are executable to display cost and performance metrics for the first processor with cost and performance metrics for the second processor.

7. The system of claim 6, wherein the performance metrics for the first processor are based on the application session of the computing system utilizing the first processor and the performance metrics for the second processor are based on a predicted application session of the computing system utilizing the second processor.

8. The system of claim 1, wherein the performance metrics for the first processor are based on the application session of the computing system utilizing the first processor and the performance metrics for the second processor are based on a predicted application session of the computing system utilizing the second processor.

9. The system of claim 1, wherein the instructions are executable to collect and store the samples of the number of events in the database.

10. The system of claim 1, wherein determining the number of events during the application session includes utilizing a hardware performance counter to determine the number of events while running applications that are specific to the computing system utilizing the first processor.

11. The system of claim 1, wherein the number of processor core dependent metrics and processor core independent metrics include:
   processor architecture events;
   processor architecture clock ticks; and
   non-processor architecture events.

* * * * *